United States Patent Office 2,702,447
Patented Feb. 22, 1955

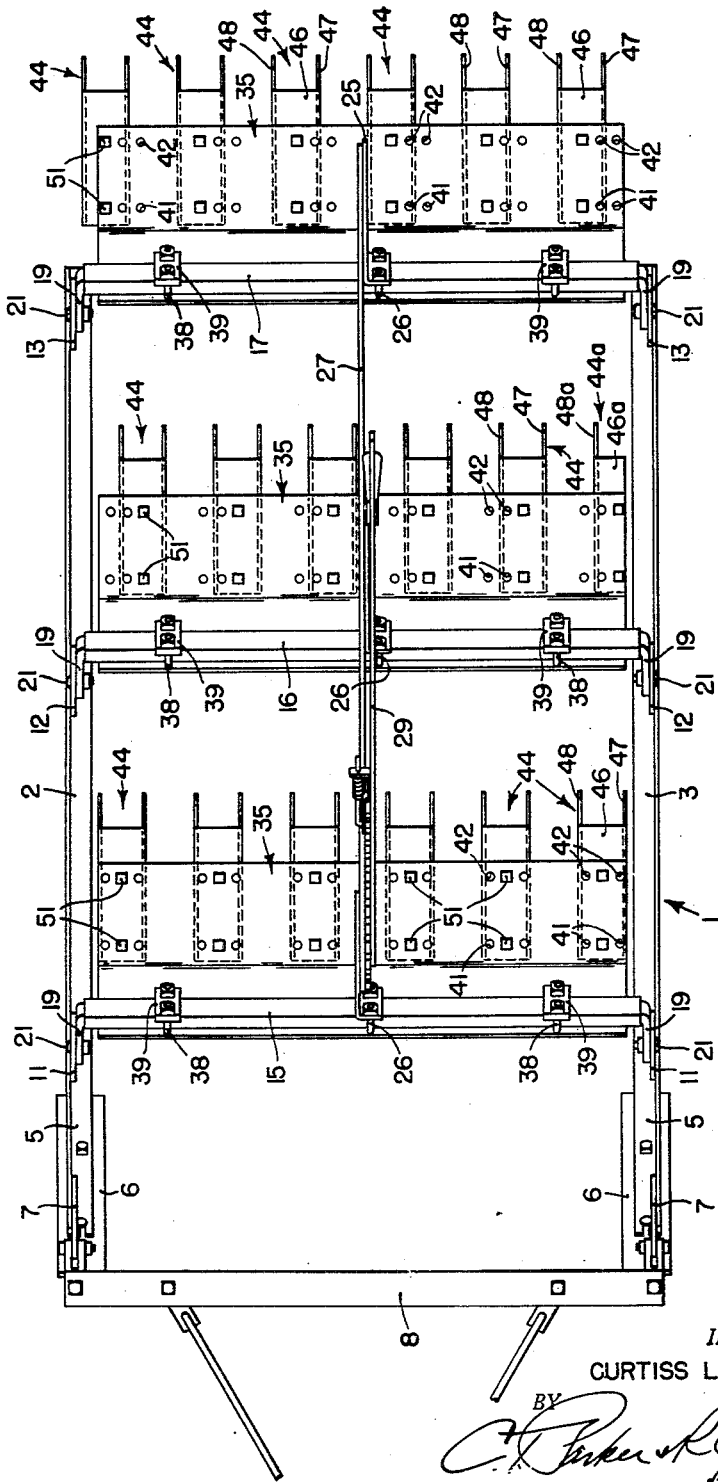

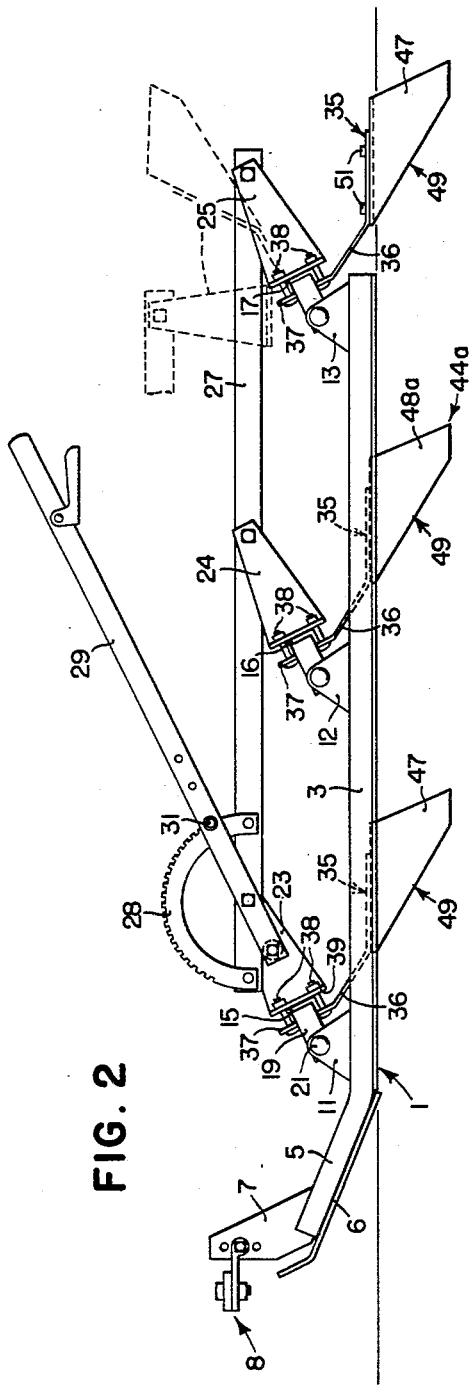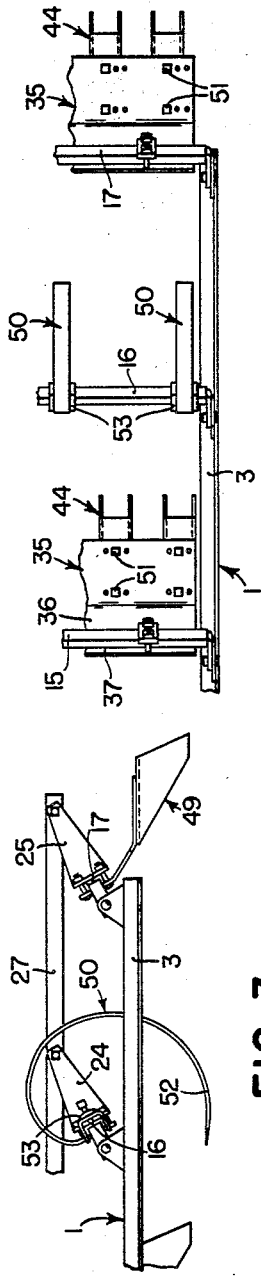

2,702,447

KNIFE-TYPE HARROW

Curtiss L. Cook, Syracuse, N. Y., assignor, by mesne assignments, to Deere & Company, Moline, Ill., a corporation of Illinois Application June 3, 1950, Serial No. 166,001

8 Claims. (Cl. 55—105)

The present invention relates generally to agricultural implements and more particularly to implements for smoothing and pulverizing plowed ground and the like.

The object and general nature of the present invention is the provision of a new and improved implement having rockably mounted bars and substantially flat plate members fixed at their forward edges to said bars to be swung upwardly and downwardly therewith and carrying substantially vertical knife elements, the cutting edges of said knife elements being varied angularly by rocking of said bars.

Another feature of this invention is the provision of a new and improved soil-smoothing and pulverizing unit which includes a flat plate having its forward portion angled upwardly and forwardly and fixed at its upper and forward portion to a rockable bar, said plate carrying soil-entering knife elements which are raised and lowered by rocking the associated supporting bar.

These and other objects and advantages of the present invention will be apparent to those skilled in the art after a consideration of the following detailed description, taken in conjunction with the accompanying drawings, in which:

Figure 1 is a plan view of one form of implement in which the principles of the present invention have been incorporated.

Figure 2 is a side view of the implement shown in Figure 1.

Figure 3 is a view similar to Figure 2, showing a modified form of the present invention.

Figure 4 is a fragmentary plan view of the form of the invention shown in Figure 3.

Referring now to the drawings, more particularly to Figures 1 and 2, the implement of the present invention comprises frame means 1 which includes a pair of fore and aft extending, generally laterally spaced frame angles 2 and 3, the front ends of which are turned upwardly, as at 5, to form runners which, in the transport position of the implement, slide easily over the ground surface. To this end, the up-turned portions 5 carry wear plates or wear shoes 6. Also secured to the front ends 5 of the frame members or runners 2 and 3 are upwardly extending hitch brackets 7 by which a draft-transmitting structure 8 is pivotally connected. Each of the frame members 2 and 3 carries a plurality of bearing brackets 11, 12 and 13, which brackets form pivotal supports for a plurality, preferably three, of transverse rockable bars 15, 16 and 17 which are spaced apart in a generally fore and aft direction. Each of the transverse bars carries an angle clip 19 at each end, the downwardly extending portion of each angle clip being apertured to receive a pivot pin or bolt 21.

Upwardly extending brackets 23, 24 and 25 are secured, respectively, as by means including clamping bolts 26, to the rockable bars 15, 16 and 17, and the arms 23—25 are interconnected by a fore and aft extending link 27. The forward end of the link 27 carries a sector 28 with which a hand lever 29 cooperates, carrying detent means 31 that is engageable with the sector 28 for holding the rockable bars 15—17 in different positions of adjustment and in a transport position, as shown by dotted lines in Figure 2, under the control of the user.

In the implement shown in Figures 1 and 2, each of the rockable bars 15, 16 and 17 carries a transversely disposed, substantially flat plate 35 which is disposed between the frame bars 2 and 3 and at its forward portion is formed with an upwardly angled section 36, the front edge of the latter having a further upwardly and forwardly angled section 37 apertured centrally to receive the bracket-attaching bolts 26 associated therewith. Additionally, each of the plates 35 is apertured at the opposite end portions of the angled section 37 to receive pairs of bolts 38 which act against clips 39 to securely and rigidly fix the plate 35 to the associated crossbar, whereby rocking the several bars 15—17 simultaneously rocks the smoothing plates 35 upwardly into and out of transport and working positions.

Each of the smoothing plates 35, the right- and left-hand edges of which lie in common vertical fore and aft extending planes passing just inside the associated inner edges of the frame bars 2 and 3, is also provided with a plurality of pairs of grouped apertures 41, 42, all of the apertures 41 being in transverse alignment and likewise the apertures 42 being in transverse alignment. The apertures 41 and 42 of each pair are in alignment in a fore and aft direction.

Secured to each of the transverse plates 35 are a number of soil-working elements 44. Each element 44 comprises a U-shaped part having a central web section 46 and a pair of planar vertical sections 47 and 48, each of which planar sections is formed with a forwardly and upwardly extending soil-cutting edge 49. The central portions 46 of the members 44 are apertured to receive attaching bolts 51, and the latter may be disposed in selected pairs 41, 42 of the apertures formed in the plates 35. The several soil-working members 44 are connected rigidly with the plate 35 by the bolts 51 associated therewith, and the members 44 do not pivot. Further, the holes 41 and 42 in the plate 35 and the members 44 are so arranged that the transverse plane which contains all of the upwardly and forwardly angled cutting edges 49 substantially coincides with the plane of the upwardly and forwardly angled section 36 of the associated flat plate 35. By virtue of this construction, any trash or the like lying on the ground is cut by the knife edges 49 into small fragments and does not tend to ball up under the plates 35 and interfere with the desired action of the implement. It will be noted from Figure 1 that the soil-working knife members 44 fixed to the intermediate plate 35 are offset laterally to the left, relative to the cutting elements 44 fixed to the forward plate 35, and that the cutting elements 44 fixed to the rearward plate 35 are offset to the right, as compared with the front cutting elements 44. This staggering of the cutting elements is made possible by the groups of apertures 41, 42 whereby different positions of the cutting elements on each plate 35 may readily be secured, as desired.

In order to present interference with the left-hand frame bar 3, when the cutting elements are arranged as shown in Figure 1, the left-hand cutting element 44a of the central set of elements includes only a web section 46a and only one knife section 48a.

The normal operating position of the implement described above is shown in Figure 2, in which the rear flat portions of the plates 35 are disposed in substantially the same plane as the lower edges of the frame bars 2 and 3. The passage of the machine over plowed ground and the like serves to crush clods and the like and also to cut trash on the ground and pulverize the soil, by virtue of the passage of the knife elements 47 and 48 through the ground. Changes in the angle of the cutting edges 49 and the area of contact between the several plates 35 and the ground may be effected by rocking the transverse bars 15, 16 and 17 into different positions by means of the hand lever 29.

In some instances, it may be desirable to replace one set of the knife elements of cutting members 44 with a ground-working tool which has a certain amount of suction, thus insuring the full penetration of the remaining knife cutters. Referring now to Figures 3 and 4, it will be observed that the central plate 35 and associated parts are removed from the center crossbar 16 and, in lieu thereof, a plurality of spring teeth 50 fixed to the bar 16, preferably two on opposite sides of the fore and aft extending bar-controlling link 27. The upper end of each tooth 50 is fixed to the bar 16 by any suitable means, such as a clamping device 51. The lower portions 52 of the spring tooth elements 50 are curved downwardly and forwardly, as best shown in Figure 3, when the brackets 23—25 have been rocked rearwardly to dispose the knife cutters 44 in operating position. This angular relation of the lower or forward portions of the tooth sections 52 causes the tooth portions 52 to act against the soil and pull or hold the implement down to its work, thus assuring full penetration of the front and rear sets of cutting members 44.

While I have shown and described above the preferred structure in which the principles of the present invention have been incorporated, it is to be understood that my invention is not to be limited to the particular means, shown and described above, but that, in fact, widely different means may be employed in the practice of the broader aspects of my invention.

What I claim, therefore, and desire to secure by Letters Patent is:

1. An agricultural implement for smoothing and pulverizing plowed ground and the like, comprising a frame including a pair of laterally spaced apart, generally fore-and-aft extending frame members, a plurality of transversely extending bars spaced apart in a fore-and-aft direction and rockably mounted at their ends on said frame members, a transversely extending substantially flat plate fixed at its forward edge to each of said bars and swingable with the latter relative to said frame, a plurality of laterally aligned, generally fore-and-aft extending soil cutting knife elements fixed rigidly to each of said plates and raised and lowered relative to the ground by rocking said bars, each of said knife elements having a forward downwardly and rearwardly extending soil-cutting edge, each of said plates having at its forward portion an upwardly and forwardly angled section, the angle of which corresponds to the angle of the soil-cutting edges of said knife elements, and the latter being secured to said plates with said cutting edges substantially flush with the upwardly and forwardly angled portion of the associated plate.

2. An agricultural implement for smoothing and pulverizing plowed ground and the like, comprising a frame including a pair of laterally spaced apart runners, a plurality of transversely extending bars spaced apart in a fore and aft direction and rockably mounted at their ends on said frame runners, a plurality of transversely extending substantially flat plates, each having a forward edge section angled upwardly and forwardly and a rear substantially horizontal section, means rigidly connecting the uppermost portions of said upturned plate sections to said bars, whereby rocking the latter serves to raise and lower said plates relative to said frame runners, means connected with said bars for rocking said bars and plates simultaneously, and a plurality of soil cutting elements fixed to said plates at the underside of said horizontal sections.

3. An agricultural implement for smoothing and pulverizing plowed ground and the like, comprising a frame including a pair of laterally spaced apart runners, a plurality of transversely extending substantially flat plates disposed between said frame runners with the ends of said plates clearing the laterally inner edges of said frame runners, means connecting said plates with said runners, each of said plates having a forward edge section angled upwardly and forwardly and a rear horizontal section, knife-like cutters fixed rigidly to said plates on the underside of said horizontal sections, each of the latter having a plurality of holes spaced apart laterally to accommodate various lateral spacing between said cutters, and fasteners disposed in selected holes in said plates for securing said cutters thereto.

4. An agricultural implement for smoothing and pulverizing plowed ground and the like, comprising a frame including a pair of laterally spaced apart runners, a plurality of transversely extending bars spaced apart in a fore and aft direction and rockably mounted at their ends on said frame runners, a plurality of transversely extending substantially flat plates disposed between said frame runners with the ends of said plates lying in common vertical fore and aft extending planes disposed laterally inwardly of the laterally inner edges of said frame runners, each of said plates having a forward edge section angled upwardly and forwardly, means rigidly connecting the uppermost portions of said upturned plate sections to said bars, whereby rocking the latter serves to raise and lower said plates between said frame runners, knife-like cutters fixed rigidly to said plates on the under side of each, each of said plates having a plurality of holes spaced apart laterally to accommodate various lateral spacing between said cutters, and fasteners disposed in selected holes in said plates for securing said cutters thereto.

5. An agricultural implement for smoothing and pulverizing plowed ground and the like, comprising a frame including a pair of laterally spaced apart runners, a plurality of transversely extending bars spaced apart in a fore and aft direction and rockably mounted at their ends on said frame runners, a plurality of transversely extending substantially flat plates, each having a forward edge section angled upwardly and forwardly, means rigidly connecting the uppermost portions of said upturned plate sections to said bars, whereby rocking the latter serves to raise and lower said plates relative to said frame runners, a plurality of U-shaped knife members fixed to each of said plates in laterally spaced apart positions, each of said members having a pair of soil-entering knife elements, each having a forwardly and upwardly extending cutting edge, the angle of which corresponds to the angle of the front edge section of the associated plate, and the knife members being fixed to each plate in positions such that the transverse plane that passes through the cutting edges of all of the knife members fixed to the associated plate contains the lower face of the upwardly and forwardly angled edge section thereof, and means for rocking said bars simultaneously for raising and lowering all of said plates and the knife members fixed thereto.

6. For use with an agricultural implement for smoothing and pulverizing plowed ground and the like, in which said implement includes frame means having a pair of generally longitudinally extending, laterally spaced apart frame members and a plurality of transversely extending bars spaced apart in a fore and aft direction and rockably mounted at their ends on said frame members: the improvement comprising a soil-smoothing and pulverizing unit including a substantially flat plate adapted to be disposed in a transverse position generally between said frame members and having at its forward edge an upwardly and forwardly angled section, means along the upper edge of said section for fixing said plate to one of said transverse bars to rock therewith, and a plurality of soil-penetrating knife elements, each including a generally vertical planar section having a cutting edge that extends forwardly and upwardly at substantially the same angle as the forwardly and upwardly extending edge portion of said plate, and means for fixing all of said knife elements to said plate with the cutting edges thereof substantially flush with the upwardly angled portion of said plate.

7. An agricultural implement for smoothing and pulverizing plowed ground and the like, comprising frame means including a pair of laterally spaced apart, generally fore-and-aft extending frame members, a plurality of transversely extending bars spaced apart in a fore-and-aft direction and connected at their ends with said frame members, a transversely extending, substantially flat plate fixed at its forward edge portion to each of the transversely extending rockably mounted bars and having a front portion extending downwardly from the associated bar and a rear tool-receiving section, and a plurality of soil-cutting knife elements fixed rigidly to the tool-receiving section of each of said plates in laterally spaced apart relation.

8. For use with an agricultural implement for smoothing and pulverizing plowed ground and the like, in which said implement includes frame means having a pair of generally longitudinally extending, laterally spaced apart frame members and a plurality of transversely extending bars spaced apart in a fore-and-aft direction and rockably mounted at their ends on said frame members: the improvement comprising a soil-smoothing and pulverizing unit including a substantially flat plate adapted to be disposed in a transverse position generally between said frame members and having at its forward edge an upwardly and forwardly angled section, means along the upper edge of said section for fixing said plate to one of said transverse bars to rock therewith, and a plurality of soil-penetrating knife elements, each including a generally vertical planar section having a cutting edge that extends forwardly and upwardly, and means for fixing all of said knife elements to said plate with the cutting edges thereof substantially flush with the upwardly angled portion of said plate.

References Cited in the file of this patent

UNITED STATES PATENTS

| | | |
|---|---|---|
| 909,051 | Barnard | Jan. 5, 1909 |
| 1,142,081 | Davis | June 8, 1915 |
| 1,222,696 | Tracy | Apr. 17, 1917 |
| 1,796,629 | Stabenow | Mar. 17, 1931 |
| 1,947,127 | Dunham | Feb. 13, 1934 |
| 1,974,869 | Hotto | Sept. 25, 1934 |
| 2,327,198 | Lingle | Aug. 17, 1943 |

FOREIGN PATENTS

| | | |
|---|---|---|
| 94,116 | Sweden | Jan. 9, 1939 |